United States Patent Office 3,441,368
Patented Apr. 29, 1969

3,441,368
WOOL SCOURING PROCESS
Raymond Arthur Couche, 168 Adelaide Terrace, Perth,
Western Australia, Australia
No Drawing. Filed July 11, 1966, Ser. No. 568,095
Claims priority, application Australia, July 12, 1965,
61,308/65
Int. Cl. D06l 1/02, 1/22
U.S. Cl. 8—139.1                                   12 Claims

ABSTRACT OF THE DISCLOSURE

The present process is for scouring wool by washing the wool with water to remove suint and then passing the washed wool through a series of stages in which it is washed with a solvent moving countercurrent to the wool with the solvent of one of the stages treated to remove substantially all the wool wax dissolved therein before the solvent is fed to the next stage.

---

This invention relates to an improved wool scouring process.

The object of the invention is to provide a wool scouring process wherein the wool wax, suint and other extraneous matter are removed from the wool with a minimum of damage to the wool fibres.

Broadly, the invention resides in a process for scouring wool which comprises washing the wool with water to remove suint and then passing the washed wool through a series of stages in which it is washed with an organic solvent or mixture of solvents in which wool wax is soluble, which is miscible with water and has a boiling point or boiling range below the boiling point of water, the solvent passing from one stage to another countercurrent to the wool, the solvent from at least one of the stages being treated where necessary to remove substantially all the wool wax dissolved therein before being fed to the next stage.

Throughout the specification and claims the wool will be described as passing from the first stage to the second stage and then to the third stage and so on whilst the water or solvent will be described as passing from the third stage to the second stage and then to the first stage. In other words the wool will be described as moving forward whilst the water or the solvent will be described as moving backward or rearward.

In a four stage process it has been found desirable that the solvent issuing from the third solvent stage should be treated to remove substantially all the wool wax dissolved therein before being fed to the second solvent stage. If the wool wax content of the wool is low the treatment of the solvent to remove the wool wax therefrom may be carried out between the second and first stages. In general it can be said that the correct point at which treatment of the solvent to remove the wool wax dissolved therein is between the stage wherein the wool wax remains completely in solution and the immediately preceding stage to which the addition of the solvent flowing rearwardly from the stage ahead causes separation of the wool wax as a separate phase. That is to say if the wool wax remains completely in solution in the third stage and the solvent mixture flowing rearwardly from the third stage when added to the second stage causes separation of the wool wax as a separate phase when operating at or about the same temperature, then the solvent mixture flowing rearwardly from the third stage should be treated to remove the wool wax dissolved therein before it is passed to the second stage.

The preferred method of removing the wool wax from the solvent after it has left one stage and before it is passed to the preceding stage is to pass the solvent with the wool wax dissolved therein through a cleaning step at the operating temperature, i.e. from about 45° C. to the boiling point of the solvent in which the dirt and solid particles are removed by a filter or centrifuge and then pass it into a refrigerated surge tank which is maintained at a temperature within the range of about 0° C. to —50° C. The dissolved wool wax precipitates from solution and may be removed by settling, centrifuging or filtration. The degreased cold solvent is then fed to the preceding stage. The precipitated wool wax contains a small amount of solvent which separates into a separate liquid phase when heated. The solvent which thus separates from the wool wax is returned to the system and recycled.

It is preferable that the water washing section and the solvent washing stages preceding the treatment of the solvent to remove the wool wax dissolved therein are carried out at or below ambient temperature, i.e. approximately 20° C. whilst the solvent washing stages ahead of the treatment of the solvent to remove the wool wax dissolved therein are carried out at an elevated temperature within the range of about 45° C. to the boiling point of the solvent at which temperature dissolution of the wool wax is rapid and the wool substantially unaffected.

The washing of the wool with cold water to remove the suint may be effected by passing the wool through a cold water bath or by spraying the wool with cold water and then removing the excess water such as by squeezing or it may comprise two or more such washes preferably with the cold water moving from one bath to another in counter-current to the passage of the wool in order to obtain the maximum removal of suint with a minimum quantity of water to produce a suint solution of reasonably high concentration. The wool thus leaves the water washing section in a squeezed or wet condition still containing substantially all of the wool wax and most of the solid impurities.

Each of the solvent washing stages comprises a vessel filled with a solvent, means being provided to pass the wool through the solvent and then substantially removing the excess solvent such as by squeezing before passing it to the next bath, the excess solvent removed by the squeezing flowing back into the vessel from which the wool has been withdrawn. Preferably the solvent in each stage which is maintained at an elevated temperature is circulated from or near the bottom of the vessel and through a filter or an alternative cleaning device to remove solid impurities, and the clean solvent returned to the vessel at or near the top thereof and preferably arranged to flow over the portion of the wool closest to the outlet from the vessel.

Solvents suitable for the purpose of the present invention include acetone, isopropyl alcohol or a mixture of ethyl alcohol, ethyl acetate and acetone in the ratio of 1:1:1, or a mixture of ethyl alcohol, ethyl acetate and isopropyl ether in the ratio of 4:2:1. Hydrocarbon solvents are not suitable for the purposes of the present invention because they are not miscible with water. It is essential that the solvent be miscible with water so that a substantial proportion of the water which remains in the wool after it leaves the water washing section will be removed in the first solvent stage. This helps to reduce the possibility of the wool felting.

Generally it has been established that in a four stage solvent process using acetone as a solvent the approximate solvent/water ratio in each stage when equilibrium has been established is as follows:

|  | Solvent, percent | Water, percent |
| --- | --- | --- |
| 1st stage | 66 | 34 |
| 2nd stage | 90 | 10 |
| 3rd stage | 95 | 5 |
| 4th stage | 99 | 1 |

If the proportion of solvent falls to approximately 93% or lower in the third stage it may be necessary to introduce a fifth stage to ensure that the wool wax remaining on the wool fibre does not exceed the level usually considered desirable for carding.

The invention will be better understood by reference to the following description of one specific embodiment thereof. In this embodiment the wool is placed on the upper run of an endless belt formed of chain mesh. The belt passes over the top of four vessels each of which is filled with water at ambient temperature. The water from each vessel is sprayed onto the surface of the wool so that it percolates therethrough and returns to the vessel. The four vessels are connected together so that water passes rearwardly from one vessel to another in counterflow to the wool, fresh water being continually added to the last vessel i.e. the fourth vessel over which the wool passes. As the wool completes its pass over each vessel, it passes through a pair of squeeze rollers to ensure that substantially all the surplus water is squeezed out of the wool. The expressed water is allowed to flow back into the vessel. With four stages of water washing a retention time of approximately 30 seconds in each stage is sufficient to ensure adequate removal of the suint.

After leaving the water washing section, the wool is passed through a series of vessels each of which is filled with acetone with water in solution, the ratios of solvent to water being approximately those indicated above. The water washed wool is placed between two carrier bands of perforated material such as nylon mesh or woven wire mesh to form a sandwich with one band forming the upper layer, the wool forming the intermediate layer and the other band forming the lower layer. The sandwich passes around alternate upper and lower guide rollers situated near the top and bottom of each vessel of the solvent washing section so that the wool moves in a downward and upward motion through the vessels. As the wool leaves one vessel and before entering the next vessel, it passes through a pair of squeeze rollers which squeeze out any excess solvent. The solvent flows countercurrent to the wool, fresh solvent being continually added to the last solvent vessel (i.e. the last vessel through which the wool passes) and the aqueous solvent mixture being withdrawn from the first solvent vessel (i.e. the first solvent vessel through which the wool passes). The aqueous solvent mixture is fed to a solvent distillation recovery unit and the solvent recovered. The solvent from stages 3 and 4 is circulated through a mechanism for removing solid impurities.

Solvent leaving the third solvent vessel through which the wool passes is passed through a chilling unit so that the wool wax dissolved therein solidifies and is separated from the solvent. The separated solvent from which substantially all the wool wax has been removed is fed into the second solvent vessel. The first and second solvent vessels are maintained cold and each of the other solvent vessels is maintained at a temperature of approximately 45°–55° C. A retention time of approximately 30 seconds in each solvent vessel ensures adequate removal of wool wax in four solvent vessels. The solvent being fed back to each stage from the stage immediately ahead should be allowed to flow over the wool immediately prior to its being squeezed by the squeeze rollers as it leaves the stage. That is to say that as the wool is leaving say the first solvent stage it is washed with the solvent being fed from the second solvent stage to the first solvent stage. This ensures that any solvent retained by the wool as it enters the second solvent stage is of a composition approximating the composition of the solvent in the second solvent stage. The wool leaving the final stage is washed with the fresh hot solvent being added to the system.

The sandwich after leaving the final solvent vessel is fed direct into a drier such as one working under a closed nitrogen system and the wool dried at approximately 60°–70° C. The nitrogen with the solvent vapour entrained therein is passed from the drier through a condenser and then through a water absorption system, the clean nitrogen being returned to the drier through a heat exchange unit and the solvent solution fed to the solvent recovery unit.

Whilst the invention has been described with particular reference to one specific form of apparatus for carrying out the process, it is not limited thereto. Any suitable form of apparatus may be used. For example, instead of being sprayed with water it may be passed through a water bath. Likewise, the wool may be sprayed with solvent in the solvent washing stage. Also, as the wool is passed through the final two solvent stages it and/or the solvent may be agitated, such as by mechanical, sonic or ultra sonic vibration or pulsation of the liquid to mechanically remove insoluble impurities such as sand and fine solids. If desired the wool may be removed from the supporting band and floated free through the final solvent washing stage.

The wool scouring process of the present invention has several advantages over the common method heretofore used based on scouring with water containing soda ash, soaps, detergents, etc. One advantage is that the suint is removed in a relatively small volume of water, mainly by the preliminary cold water washing and to a lesser extent in the first stage of the solvent treatment from which it is left behind as an aqueous solution after recovery of the solvent from the mixture of solvent and water leaving the first stage of the solvent treatment process. The fact that the suint exists in a relatively small volume of water, on the one hand, allows of its recovery as a valuable product containing salts of potassium by evaporation of the water and, as well, substantially eliminates the need to dispose of any objectionable scouring liquor of any kind. If, however the water containing the suint is not evaporated, it may be disposed of into sewer, river or ocean without possessing highly objectionable wool grease. Another advantage is that the wool grease recovered by the chilling process is not admixed with suint and solid impurities and is in a highly pure form. A further advantage is that the wool scoured by the process is relatively non-felted and is not damaged when dried.

The process of the present invention is also superior to the known solvent scouring processes using hydrocarbon solvents. Because the solvent used in the present process is water miscible, the possibility of emulsions forming is minimised, whereas when hydrocarbon solvent and water are present together with suint and/or wool wax, the possibility of the formation of troublesome emulsions is very great. Furthermore, the drying of the water wet scoured wool is avoided.

It is also believed that in the present process the oxidised wool wax which is normally present on the tips of the wool fibres is dissolved in the solvent and is not precipitated when the solvent is refrigerated. Thus the problems caused by this oxidised wool wax in the conventional detergent scouring processes (it is believed to produce troublesome emulsions) and in the conventional hydrocarbon solvent scouring processes (it dissolves with difficulty in the hydrocarbon solvent and contaminates the unoxidised wool wax) is substantially eliminated.

The following specific examples will serve to illustrate the present invention:

Three different types of wool [(1) fleece (2) premature (lambs) wool (3) crutchings] were processed by the solvent system described above. Each was processed in sequence one after the other using the same suint washing and solvent solutions in circuit throughout. Twenty four (24) batches of fleece were processed before taking four batches as typical of the process. This was followed by five batches of premature wool to allow for process variation before two further batches were processed as typical of this type of wool. Further, three batches of crutchings were processed to allow for process variations and an additional two batches were processed for the third example.

PROCESS OPERATING DATA

(a) Water washing section (i) Four stage countercurrent suint water wash at ambient temperature (16°–18° C.)

(ii) 150 ml. suint solution removed from the first water washing stage per batch of 50 g. raw wool.

(iii) 300 ml. water added to stage 4 for each batch and 300 ml. of solution transferred rearwardly from stage 4 to 3, 3 to 2, 2 to 1 for each batch. Approximately 150 ml. of stage 4 solution passed out with the wool from stage 4.

(b) Solvent washing section (iv) Four hundred ml. fresh acetone was added to stage 4 of the solvent circuit for each batch until batch 24 when this volume was increased to 450 ml. The higher quantity was found necessary to maintain the desired solvent/water ratio.

(v) For each stage of process the equivalent volume of solution was transferred from stages 4 to 3, 3 to 2, 2 to 1, and 1 to solvent recovery.

(vi) Stage 1 was operated at or just below ambient temperature i.e. 16°–18° C. Stage 2 at 0° C. ±2° C. Stage 3 at 50°±2° C. Stage 4 at 50°±2° C.

(c) Wool wax recovery (vii) The hot stage 4 liquors were filtered and the hot stage 3 liquors settled for a few minutes to remove dirt. The hot stage 3 liquor which was transferred to stage 2 was filtered and refrigerated to between −40° and −50° C. to precipitate wool wax which was removed by centrifuging the slurry produced in the refrigeration step.

(viii) The grease sludge recovered was heated to about 50° C.–55° C. when it separated into two layers—one predominantly wool wax and the other predominantly solvent. The solvent as decanted from the wool wax and recycled to stage 3 solvent.

(d) General (ix) The wool was processed in sandwich form between 6 mesh woven wire. It was not agitated in each stage of the suint circuit and gently moved to simulate solvent flow through the sandwich during each solvent stage.

The wool was squeezed between the mesh to press as much liquid as possible from the sandwich between each stage and at the end of the process.

Ultrasonic impulses were impressed on the batch for each of the solvent stages 3 and 4.

(x) Suint washing involved placement of the wool in solutions of each stage in sequence.

(xi) Solvent degreasing involved the flow of the transfer liquid from the succeeding stage over the outgoing solvent saturated sandwich immediately prior to squeezing and in the last stage the displacement liquor was the hot fresh solvent (acetone) addition.

(xii) Wool wax was stripped of solvent under vacuum.

(xiii) Scoured wool was dried at 70° C.

(xiv) Solvent was recovered by distillation.

(xv) The volume of solvent was observed for each stage and loss due to evaporation was made up with fresh solvent.

(xvi) The solvent used was acetone.

(xvii) The retention time in each stage in both the water and solvent washing sections for 30 seconds.

RESULTS

Example 1.—Fleece

Yield of scoured wool ___ 58.25%.
Yield of wool wax _____ 13.43% (of raw wool), (23% of scoured wool).
Residual wool wax in
 scoured wool _____ 0.42% of bone dry scoured wool.

The wool fibres in the scoured wool were clean and undamaged and had a soft feel. Some dirt still adhered to the tips of the fibres but this was readily removed by lightly rubbing between the fingers indicating that it would be readily removed during carding. A minor amount of sand was trapped between the fibres and fell freely from the wool when the wool was handled.

The wool wax a light brownish yellow indicating a good quality grease. The free fatty acid content was 1.4% as oleic acid.

Example 2.—Premature wool (lambswool)

Yield of scoured wool _____ 61.9%.
Yield of wool wax _____ 7.4% of raw wool, (12.0% of scoured wool).
Residual wool wax in
 scoured wool _____ 0.23% of bone dry scoured wool.

The scoured wool had similar properties to that described under Example 1.

The wool wax was a light brownish yellow having a free fatty acid content of 1.03% as oleic acid.

Example 3.—Crutchings

Yield of scoured wool _____ 57.7%.
Yield of wool wax _____ 5.9% of raw wool, (10.2% of scoured wool).
Residual wool wax in
 scoured wool _____ 0.15% of bone dry scoured wool.

The scoured wool was slightly grey in colour, the fibres undamaged, had a soft feel and was fairly free of dirt.

The wool wax was a light brownish yellow having a free fatty acid content of 1.2% as oleic acid.

I claim:

1. A process for scouring wool which comprises washing the wool with water to remove suint and then passing the washed wool through a series of stages in which it is washed with an organic solvent material in which wool wax is soluble, which is miscible with water and has a boiling point or boiling range below the boiling point of water, the solvent passing from an one stage to another countercurrent to the wool, the solvent from at least one of the stages being treated to remove substantially all the wool wax dissolved therein before being fed to the next stage.

2. A process as claimed in claim 1 wherein the treatment of the solvent to remove the wool wax therefrom is carried out between the solvent stage wherein the wool wax remains completely in solution and the immediately preceding stage to which the addition of the solvent flowing rearwardly from the stage ahead causes separation of wool wax in said immediately preceding stage when operated at or about the same temperature.

3. A process as claimed in claim 2 wherein the washed wool is passed through a series of four stages and in a four stage solvent washing section the treatment of the solvent to remove the wool wax therefrom is carried out between the third and second stages.

4. A process as claimed in claim 2 wherein the washed wool is passed through a series of four stages and in a four stage solvent washing section the treatment of the solvent to remove the wool wax therefrom is carried out between the second and first stages.

5. A process as claimed in claim 1, wherein the solvent is treated by filtering or centrifuging to remove dirt and solid particles, cooling the filtered or centrifuged liquid to a temperature of between 0° C. and −50° C. and then separating the solvent from the wool wax which precipitates on cooling of the liquid.

6. A process as claimed in claim 1 wherein the water washing and the solvent washing stages preceding the treatment of the solvent to remove the wool wax dissolved therein are carried out at or below ambient temperature.

7. A process as claimed in claim 1 wherein the latter stages of solvent washing are carried out at a temperature within the range of substantially 45° C. to the boiling point of the solvent.

8. A process as claimed in claim 1 wherein excess liquor is removed from the wool by squeezing after it leaves each water and solvent washing stage and before it enters the next stage.

9. A process as claimed in claim 1 wherein the solvent is selected from the group consisting of acetone, isopropyl alcohol, a mixture of ethyl alcohol, ethyl acetate and acetone, and a mixture of ethyl alcohol, ethyl acetate and isopropyl ether.

10. A process as claimed in claim 1 wherein the solvent or water passing from one stage to the preceding stage is allowed to flow over or is sprayed over the wool as it leaves said preceding stage and before the excess liquor is removed from said wool.

11. A process as claimed in claim 1 wherein the wool is agitated by mechanical, sonic or ultra sonic vibrations or by pulsation of the liquid as it passes through the latter solvent stages.

12. A process for scouring wool which comprises washing the wool with water at or below ambient temperature to remove suint, passing the wet washed wool through at least one stage in which it is washed with organic solvent material at or below ambient temperature and then through at least one stage in which it is washed with the same organic solvent material at an elevated temperature within the range of about 45° C. to the boiling point of the solvent, the solvent passing from one stage to another countercurrent to the wool and the solvent discharged from the elevated temperature stage being treated to remove substantially all the wool wax dissolved therein before being passed to the low temperature stage, said solvent material being capable of dissolving wool wax, being miscible with water, and having a boiling point or boiling range below the boiling point of water.

References Cited

UNITED STATES PATENTS

| | | | |
|---|---|---|---|
| 1,521,624 | 1/1925 | Herzog | 8—139.1 |
| 1,693,106 | 11/1928 | Brauckmeyer | 8—139.1 |
| 1,718,548 | 6/1929 | Engelhardt | 8—139.1 |
| 3,210,148 | 10/1965 | Delforge | 8—139.1 |
| 3,390,950 | 7/1968 | Delforge | 8—139.1 |

MAYER WEINBLATT, *Primary Examiner.*

U.S. Cl. X.R.

8—139; 134—10, 13; 260—412.5, 412